United States Patent
Yamaya (10) Patent No.: US 8,248,218 B2
(45) Date of Patent: Aug. 21, 2012

(54) HANDWRITING ELECTRONIC INPUT SYSTEM

(75) Inventor: Yorihiro Yamaya, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 659 days.

(21) Appl. No.: 12/519,814

(22) PCT Filed: Dec. 5, 2007

(86) PCT No.: PCT/JP2007/073473
§ 371 (c)(1),
(2), (4) Date: Jun. 18, 2009

(87) PCT Pub. No.: WO2008/078523
PCT Pub. Date: Jul. 3, 2008

(65) Prior Publication Data
US 2010/0090815 A1  Apr. 15, 2010

(30) Foreign Application Priority Data
Dec. 25, 2006  (JP) .................................. 2006-347775

(51) Int. Cl.
*G08B 6/00* (2006.01)
*G09B 21/00* (2006.01)
*H04B 3/36* (2006.01)
*G06F 3/041* (2006.01)

(52) U.S. Cl. ............... 340/407.2; 340/407.1; 340/4.12; 345/173; 345/174; 345/179

(58) Field of Classification Search ............... 340/407.2, 340/407.1, 4.12
See application file for complete search history.

(56) References Cited

U.S. PATENT DOCUMENTS

| | | | | |
|---|---|---|---|---|
| 4,667,182 A | * | 5/1987 | Murphy | 340/407.2 |
| 6,215,901 B1 | * | 4/2001 | Schwartz | 382/186 |
| 6,839,053 B2 | * | 1/2005 | Lapstun et al. | 345/173 |
| 7,119,796 B2 | * | 10/2006 | Van Dam et al. | 345/173 |
| 7,176,906 B2 | * | 2/2007 | Williams et al. | 345/179 |
| 2006/0159345 A1 | * | 7/2006 | Clary et al. | 382/186 |
| 2007/0080951 A1 | * | 4/2007 | Maruyama et al. | 345/173 |

FOREIGN PATENT DOCUMENTS
EP  1130537 A2  9/2001
(Continued)

OTHER PUBLICATIONS

Jeng-Sheng Yeh, et al. "On the Effects of Haptic Display in Brush and Ink Simulation for Chinese Painting and Calligraphy" Computer Society, Oct. 9, 2002, pp. 439-441, 10th Pacific Conference on Computer Graphics and Applications, Beijing, China.

(Continued)

*Primary Examiner* — Donnie Crosland
(74) *Attorney, Agent, or Firm* — Lucas & Mercanti, LLP (57) ABSTRACT

An handwriting electronic input system in which a feeling representing that of handwriting performed actually using a writing instrument can be attained when handwriting input is performed electrically. The electric handwriting input system to perform handwriting electrically is provided with a handwriting input section used in handwriting input of operator's handwriting information, a handwriting input detection section to detect handwriting input through the handwriting input section, wherein the handwriting input section is provided with a handwriting feeling producing section to generate a vibration represents a handwriting feeling in accordance with operation of the handwriting input section at handwriting input of information.

6 Claims, 5 Drawing Sheets

FOREIGN PATENT DOCUMENTS

| | | |
|---|---|---|
| JP | 07266779 | 10/1995 |
| JP | 08190450 | 7/1996 |
| JP | 10057793 | 3/1998 |
| JP | 10091317 | 4/1998 |
| JP | 2003346171 | 12/2003 |
| JP | 2004284341 | 10/2004 |
| JP | 2004342024 | 12/2004 |

OTHER PUBLICATIONS

Sulaiman, S. & Blandford, A. "Haptic Cues for Supporting Interaction Design in the Drawing Domain" Proc. HCI' 04, Dec. 31, 2004, pp. 117-120.

Johnny C. Lee, et al. "Haptic Pen: Tactile Feedback Stylus for Touch Screens", Oct. 31, 2004, Mitsubishi Electric Research Laboratories.

* cited by examiner

HANDWRITING ELECTRONIC INPUT SYSTEM

This is a U.S. National Phase Application under 35 U.S.C. 371 of International Application PCT/JP2007/073473, filed on Dec. 5, 2007, which claims the priority of Japanese Application No. 2006-347775, filed Dec. 25, 2006, the entire content of both Applications are hereby incorporated by reference.

TECHNICAL FIELD

The present invention relates to an handwriting electronic input system to electrically perform input of a handwriting transcript, and in particular to a system to perform handwriting input of handwriting information of an operator on a handwriting information input detection section using a handwriting input section.

PRIOR ART

As a conventional input method to information processing terminals, an input method through pointing sections such as a keyboard, a mouse and a track ball have been common.

Also, for an application of designing, a section for handwriting using a stylus on a tablet is used.

As for the above application, related technologies are cited in Patent Document 1: Unexamined Japanese Patent Application Publication No. H10-91317 (Page 1, FIG. 1) and Patent Document 2: Unexamined Japanese Patent Application Publication No. 2004-342024 (Page 1, FIG. 1).

As the handwriting input section using the stylus on the tablet, a section realizing a feeling close to real handwriting is desired.

For such applications, a technology is cited in Patent Document 3: Unexamined Japanese Patent Application Publication No. H8-190450.
Patent Document 1: Unexamined Japanese Patent Application Publication No. H10-57793 (Page 1, FIG. 1)
Patent Document 2: Unexamined Japanese Patent Application Publication No. 2004-342024 (Page 1, FIG. 1)
Patent Document 3: Unexamined Japanese Patent Application Publication No. H8-190450 (Page 1, FIG. 1)

DISCLOSURE OF THE INVENTION

Problems to be Solved by the Invention

In the technologies of the Patent Documents 1 and 2, there is still remained a problem that in an aspect of writing feeling on the tablet, nothing is different from the conventional tablet input section.

In the technology disclosed in the Patent Document 3, sound of writing on paper is reproduced while performing handwriting on the tablet surface. Thus, though the feeling of mock handwriting can be tasted, a feeling of actually writing propagated to a hand cannot be reproduced.

One aspect of the present invention is to resolve the above problems and an object of the present is to realized an handwriting electronic input system capable of obtaining a feeling representing that of handwriting performed actually using a wiring instrument.

Means to Resolved the Problem

The present invention to resolve the above problem is described as follow.

1. An handwriting electronic input system to electrically perform handwriting input, having: a handwriting input section used in handwriting input of information by an operator; and a handwriting input detection section to detect handwriting input of the information through the handwriting input section for information; wherein the handwriting input section for information is provided with a handwriting feeling producing section to generate a vibration representing a handwriting feeling in accordance with operation of the handwriting input section at handwriting input of the information.
2. The handwriting electronic input system of item 1 to electrically perform handwriting input, further having: a memory section to store a vibration wave generated by carrying out handwriting using a writing instrument on a writing object, wherein the handwriting feeling producing section generates the vibration which is created by reproducing the vibration having been generated between the writing instrument and the writing object.
3. The handwriting electronic input system of item 2, further comprising: an operation section to perform various entries, wherein the memory section stores information of the writing instrument which is a thickness, a hardness, a smoothness and an elasticity of a pen tip in conjunction with the vibration waves, and information of a surface condition of the writing object in conjunction with the vibration waves so that the vibration wave stored in the memory section can be read out based on the information of the writing instrument or the writing object entered though the operation section.
4. The handwriting electronic input system of item 3, wherein information of ink viscosity used in the writing instrument is stored in the memory section in conjunction with the vibration wave.
5. The handwriting electronic input system of any one of items 1 to 4, wherein the handwriting feeling producing section is disposed at a grip position.
6. The handwriting electronic input system of any one of items 1 to 4, wherein the handwriting feeling producing section is disposed at a position in contact with the handwriting input detection section.

Effect of the Invention

According to the handwriting electronic input system of the present invention, the following effects can be obtained.

(1) In the invention disclosed in item 1, when handwriting input is performed electronically, handwriting information input of an operator is performed in respect to the handwriting input detection section by the handwriting input section for information, a hand writing feeling producing section generates a vibration representing the handwriting feeling in accordance with operation of the handwriting input section at handwriting input of information.

Meanwhile, "generating" by the handwriting feeling producing section means to generate and propagate the vibration representing the handwriting feeling.

Whereby, an handwriting electronic input-system capable of obtaining the equivalent feeling of actual handwriting when handwriting input is performed electronically can be realized.

(2) In the invention disclosed in item 2, a vibration wave generated by performing handwriting on a writing object with a writing instrument is stored in the memory section, and the handwriting feeling producing section refers to the vibration wave stored in the memory section so as to reproduce and generate the vibration created between the writing instrument and the writing object.

Whereby, there is realized the handwriting electronic input system, wherein the feeling representing a feeling of handwriting actually performed using the writing instrument and the writing object can be obtained when the handwriting input is electrically performed in a state of combination of various kinds of writing instruments and writing objects.

(3) The invention disclosed in item 3 is provided with an operation section to perform various kinds of entries. In the aforesaid memory section, information of the writing instrument i.e. a thickness, a hardness, a smoothness and flexibility of a pen tip is stored in conjunction with the vibration waves. The vibration wave stored in the memory section is readout based on the information of the writing instrument or the information of the writing object entered from the operation section.

Whereby, when the handwriting input is electrically performed, in a state of combination of various kinds of writing instruments and writing objects, the handwriting electronic input system capable of obtaining the equivalent feeling when handwriting is actually performed can be realized.

(4) In the invention of item 4, information of viscosity of ink used for the writing instrument is stored in the memory section.

Whereby, there is realized an handwriting electronic input system wherein when the handwriting input is electrically performed, the feeling representing handwriting actually performed is obtained in a state of combination of various kinds of writing instruments and writing objects.

(5) In the invention of item 5, the handwriting feeling producing section is disposed at a grip position of the handwriting input detection section for information Whereby, there is realized an handwriting electronic input system wherein when the handwriting input is electrically performed, the feeling representing handwriting actually performed is efficiently obtained in a state of combination of various kinds of writing instruments and writing objects.

(6) In the invention of item 6, handwriting input detection section for information is provided with the handwriting feeling producing section at a position in contact with the handwriting input detection section for information.

Whereby, there is realized an handwriting electronic input system wherein when the handwriting input is electrically performed, the feeling representing handwriting actually performed is truly obtained in a state of combination of various kinds of writing instruments and writing objects.

DESCRIPTION OF THE SYMBOLS

100 Handwriting electronic input system
101 Processing section (control section)
103 Memory section
105 Operation section
120 Handwriting input section
130 Handwriting input detection section
140 Handwriting feeling producing section
200 Computer

DESCRIPTION OF THE PREFERRED EMBODIMENTS

A best mode the present invention will be specifically described with reference to the drawings.

(1) Configuration of the Handwriting Electronic Input System

Figure 1:
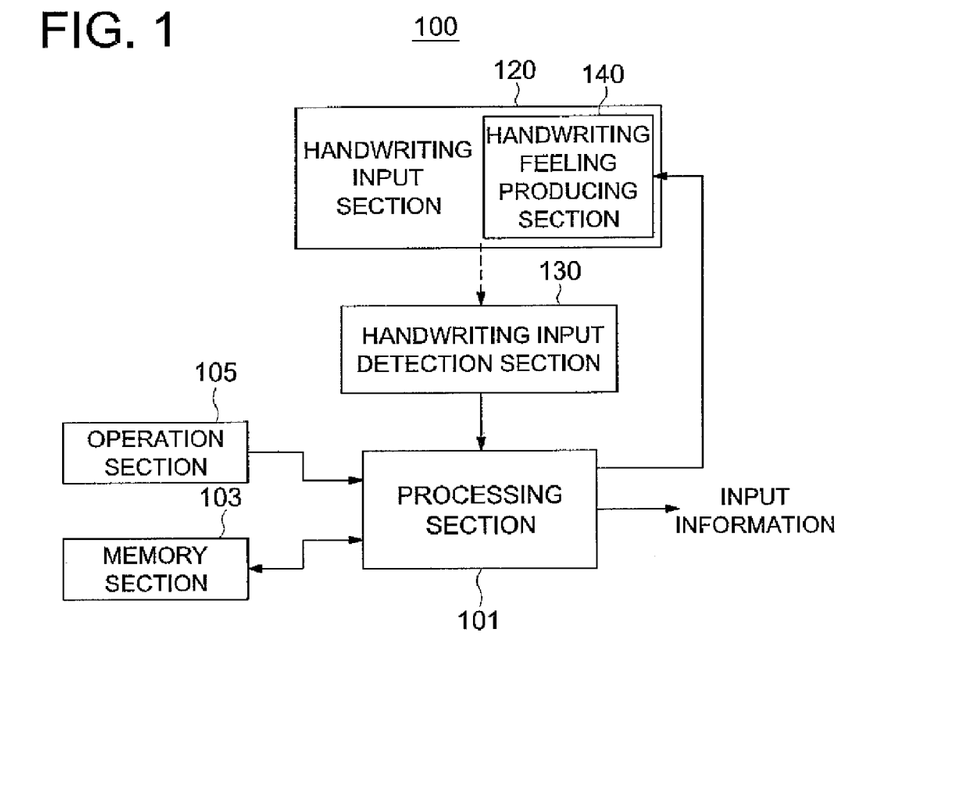
FIG. 1 is a block diagram showing a structure of an embodiment of the present invention.
Figure 2:
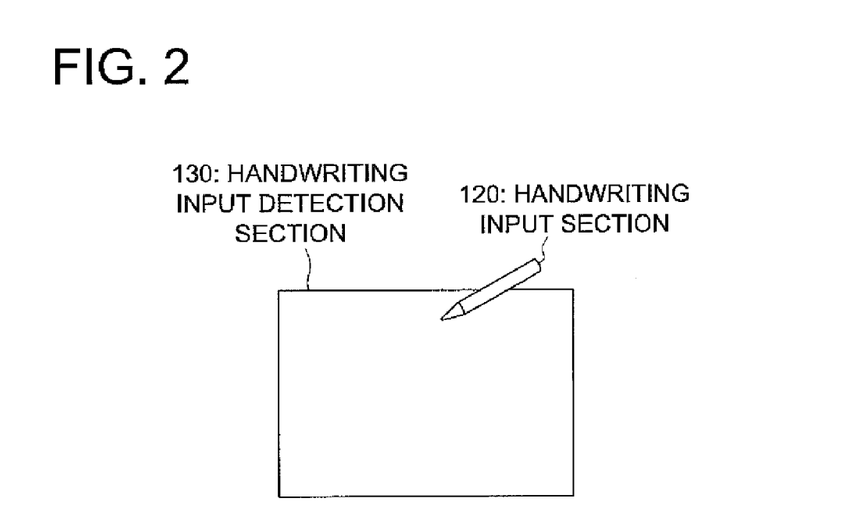
FIG. 2 is an explanatory diagram showing a structure of an embodiment of the present invention.

FIG. 1 is a block diagram showing detailed configuration of the handwriting electronic input system 100 to perform handwriting input electrically. Meanwhile, in FIG. 1, components necessary to describe operation of the present embodiment are mainly described and various kinds of well-known components such as a power switch and a pour supply circuit are omitted. Also, FIG. 2 is an external view showing an example of the handwriting electronic input system 100.

Here, the processing section 101 is a processing section or control section to execute various kinds of processing which creates data (input information) according to handwriting input and executes control to generate the vibration representing a handwriting feeling.

The memory section 103 is a memory device to store various kinds of data and various setting values. In the present embodiment, vibration wave data (FIG. 4a) obtained when handwriting input is performed by the writing instrument on the writing object is stored as basic information. Further, information of the thickness, the hardness, the smoothness, and the elasticity of the pen tip, the viscosity and material of ink, a surface condition (surface profile and friction coefficient) are stored in conjunction with the vibration wave data.

The operation section 105 is an operation device or a selection device to perform setting of the thickness, the hardness, the smoothness, and the elasticity of the pen tip and the surface condition of the writing object.

The handwriting input section for 120 is a pin type or stylus type handwriting input section used as the writing instrument for handwriting input of information of the operator.

The handwriting input detection section 130 is used as the writing object when handwriting input is performed by the handwriting input section 120 (input by handwriting) which is a handwriting input detection device such as a tablet and a touch panel to detect handwriting input.

Meanwhile, a relation between the handwriting input section 120 and the handwriting input detection section 130 is, for example, as shown in FIG. 2. Namely, using the handwriting input section 120, the operator performs handwriting input on an input surface of the handwriting input detection section 130.

The handwriting feeling producing section 140 is a handwriting feeling producing device to generate the vibration representing the handwriting feeling in accordance with the operation of the handwriting input section 120 by the operator when handwriting input is performed.

Meanwhile, "generating" by handwriting feeling section means to generate and propagate the vibration representing the handwriting feeling.

Figure 3A:
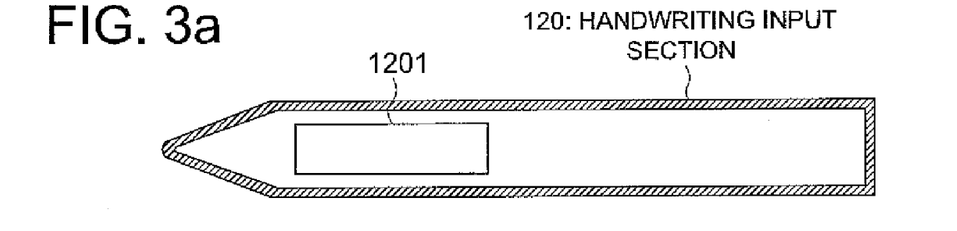
FIGS. 3a, 3b and 3c are explanatory diagrams showing structures of embodiments of the present invention.

The handwriting feeling producing section 140 can employ, for example, a vibration generating section 1201 configured with various kinds of actuators such as a voice coil motor inside the handwriting input section 120 as FIG. 3a shows.

Figure 3B:
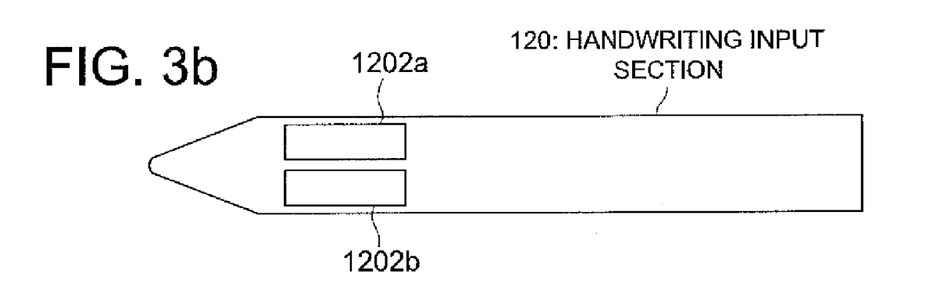

Also, as the handwriting feeling producing section 140, for example, as FIG. 3b shows, a plurality of vibration generating sections 1202a and 1202b, configured with various kinds of elements such as a plurality of piezoelectric elements disposed at a vicinity of the grip on the surface of the handwriting input section 120, can be utilized. In the above case, a similar feeling to the feeling of handwriting actually performed using the writing instrument can be efficiently obtained.

Meanwhile, in the above embodiment, "grip position" means a position to which the fingers and thumb contact when an average operator grips the handwriting input section 120 as the writing instrument, and preferably the position to which the thumb, first finger and the second finger contact.

Figure 3C:
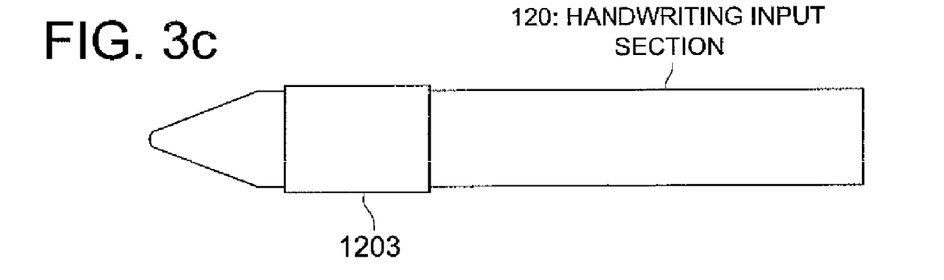

Also, as the handwriting producing section 140, for example, as FIG. 3c shows, a vibration generation section 1203 configured with various kinds of elements such as piezoelectric elements, which are disposed in a shape of a cylinder at a vicinity of the grip on a surface of the handwriting input section 120, can be utilized.

Meanwhile, the surface means not only an outer most circumference surface in the literature but inside of the surface protection film and so forth. Also, a portion of a cylinder section representing a housing of the handwriting input section 120 can be integrally configured with the vibration generation section such as the piezoelectric element.

Also, the handwriting feeling producing section 140 can be provided with the vibration generation section (unillustrated) such as the piezoelectric element at the pen tip section which generates vibration by contacting an ordinary writing instrument with the writing object. In the above case, the same feeling as that of handwriting actually performed using the writing instrument can be truly obtained.

Further, though it is not illustrate, the handwriting producing section 140 can be provided with a vibration generation section, such as the piezoelectric element to generate vibration by contacting the writing instrument with the writing object, at on an entire surface side of the handwriting input detection section 130.

Meanwhile, as the vibration generation device used in the handwriting feeling producing section 140, beside the voice coil motor and the piezoelectric element, an electro magnetic solenoid, a vibration motor, a piezoelectric film, a magnetostrictor element, an ultra magnetostrictor element, air and a pressure adjusting element, hydraulic oil and a pressure adjusting element, electric viscous fluid and a pressure adjusting element, and a shape memory alloy can be used.

Operation to electronically perform handwriting input will be described with reference to a flow chart in FIG. 5.

First, when the operator performs handwriting input using handwriting input section 120 and handwriting input detection section 130, the writing instrument and the writing object from which writing feeling is obtained are selected (Step S501 in FIG. 5), for example, selection such as a fountain pen having a thick and soft pent tip as a writing instrument and a Kent papaer as a writing object respectively is performed. In case the operator does not perform selection in particular, a predetermined condition (such a water base ball point pen as a writing instrument and a high quality sheet as a writing object) is selected. Based on the condition selected as above, the processing section 101 reads out vibration wave data (for example FIG. 4a) form the memory section 103.

Meanwhile, as the vibration wave data, vibration wave data created by combining a selected writing instrument and selected writing object stored in the memory section 103 in advance can be used. Or one of combinations of the filter and the vibration wave data i.e. a combination of selected writing instrument and a predetermined standard writing object or a combination of the selected writing object and a predetermined standard writing instrument can be used. Further a combination of basic vibration wave data of the standard writing instrument and the standard writing object, and the filter in accordance with the writing instrument and the writing object can be used.

In the above, if a thick writing instrument or a soft writing instrument and a smooth writing object are selected in Step S501, a low pass filter can be used for the basic vibration wave data. If a thin or hard writing instrument and not smooth writing object are selected, a high frequency emphasizing filter can be used for the basic vibration wave data.

Namely, as above, filtering processing can cope with multiple patterns in respect to the basic vibration wave data. Also, basic vibration wave data is not only one, combination of several pieces of basic wave data and filtering processing can be used.

Figure 5:
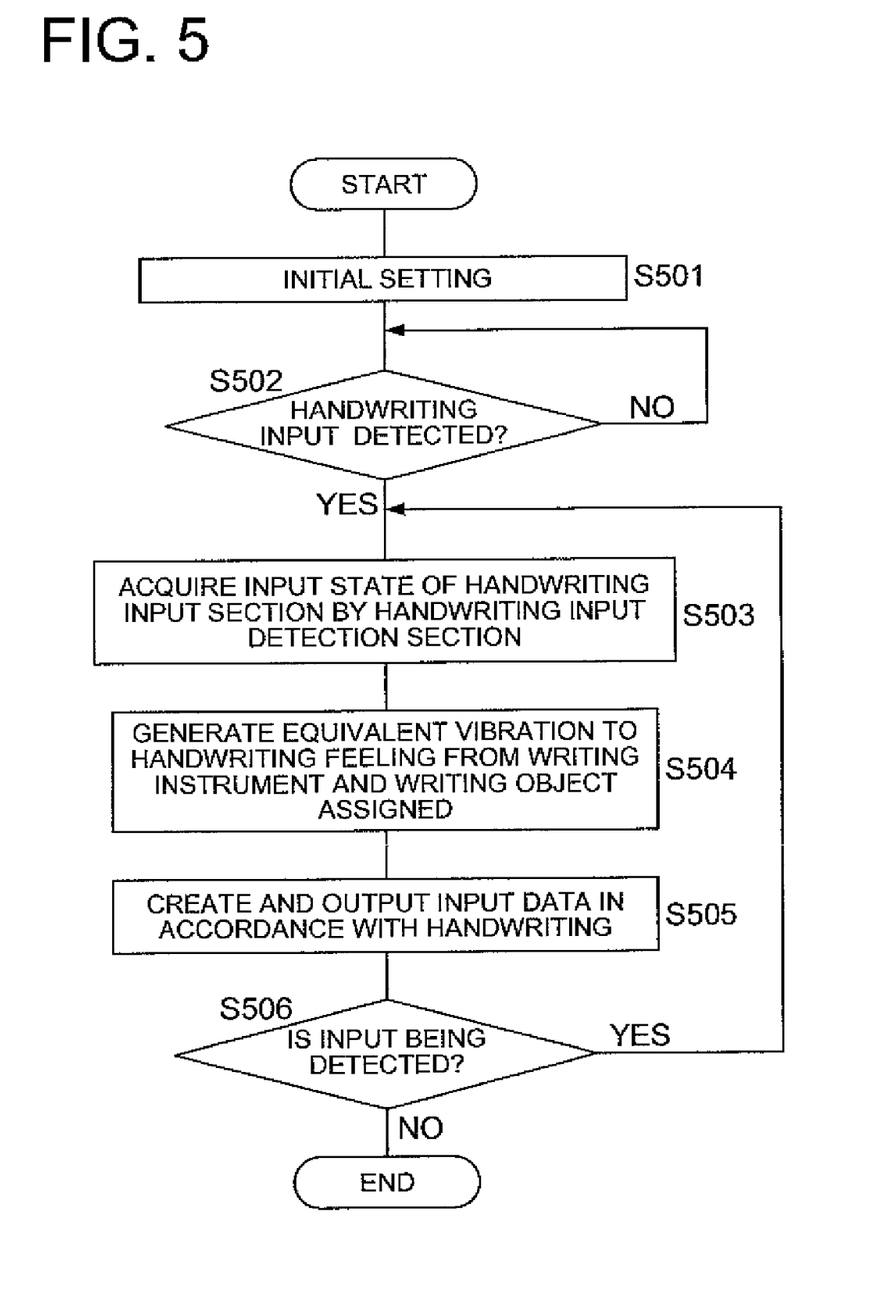
FIG. 5 is a flow chart showing operation of an embodiment of the present invention.

In the handwriting input detection section 13, when handwriting input through handwriting input section 120 is detected (Step S502 in FIG. 5), the handwriting input detection section 130 acquires an input state (input position, input pressure and input time) at an input surface and propagates to a processing section 101 (Step S503 in FIG. 5).

Here, the processing section 101 refers to a condition of the writing instrument and the writing object assigned and reads out the vibration wave data corresponding to necessary setting and necessary filter data from the memory section 103. Then based on the vibration wave data and filter data read out, the processing section 101 acquires information of the input state at the handwriting input detection section 130 and generates the vibration representing the handwriting feeling corresponding to the writing instrument and writing object set (Step S504 in FIG. 5).

Figure 4A:
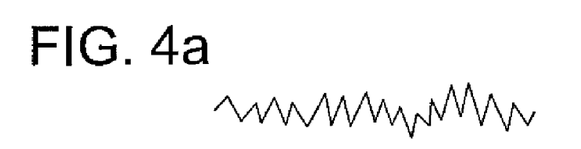
FIGS. 4a, 4b, 4c, 4d, 4e and 4f are waveform diagrams showing vibration waves of embodiments of the present invention.
Figure 4B:
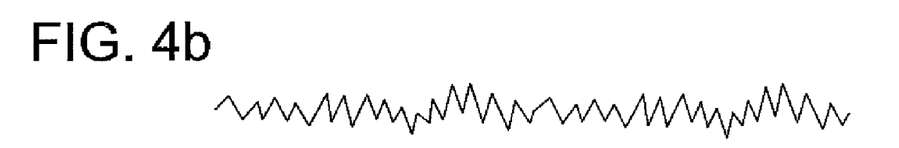

Meanwhile, the vibration wave data stored in the memory section 103 represents a predetermined time period such as FIG. 4a. For example, if the handwriting input lasts long time according to the information of input state form the handwriting input detection section 130, the vibration wave data for a unit time is used by repeating it so as to generate vibration in accordance with operation of the handwriting input section 120 wherein the vibration wave of FIG. 4a is converted into such wave as in FIG. 4b.

In the above case, the processing section 101 applies an electric signal onto the handwriting feeling producing section according to the vibration wave, so that the handwriting feeling producing section generates vibration and the vibration is propagated to the fingers of the operator. Whereby, the operator can perform handwriting input with a feeling of using a conventional pen and a sheet of paper.

Figure 4C:
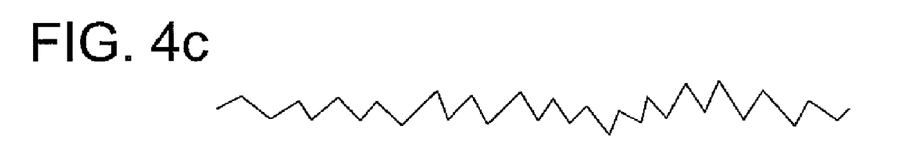
Figure 4D:
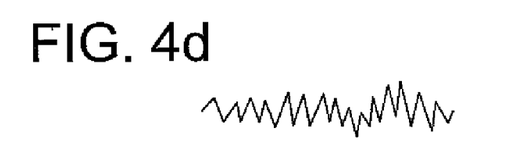
Figure 4E:
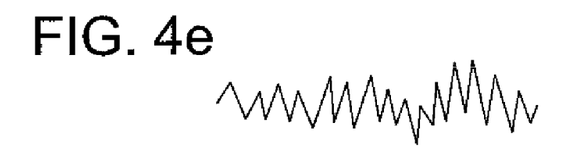
Figure 4F:
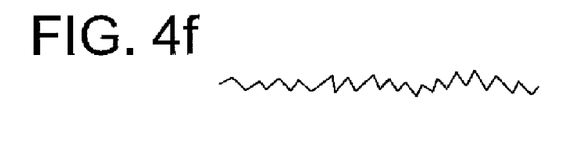

Also, the vibration wave data stored in the memory section 103 represents a predetermined unit time such as in FIG. 4a when the handwriting input section 120 is moved at a predetermined speed. If the handwriting input section 120 is moved slower that the predetermined speed, (slow handwriting) the vibration wave is extended in a time axis to generate the vibration as FIG. 4c. If the handwriting input section 120 is moved faster than the predetermined speed, vibration is generated in a state where the vibration wave is contracted in the time axis.

Also, the vibration wave data stored in the memory section 103 represents the predetermined unit time period such as FIG. 4a, and a case where handwriting was performed by handwriting input section 120 in respect to handwriting input detection section 130 with a predetermined pressure. Whereby, if handwriting with the handwriting input section 120 is performed with a higher pressure than the predetermined writing pressure (strong writing), the vibration is generated in a state where amplitude of the vibration is increased. Also in case the handwriting pressure of the handwriting input section 120 is lower than the predetermined pressure (feeble writing), the vibration is generated in a state where the amplitude of the vibration is decreased.

Also, in parallel with the above vibration generating processing, the processing section 101 acquires information of handwriting input condition at the handwriting input detection section for information section 130 and outputs input data of characters or images in accordance with the handwriting pressure as input information to external equipment (Step S505 in FIG. 5).

Thus, the above operation is repeatedly performed while the input is detected by the handwriting input detection section 130 (Steps S506: Yes and S503).

According to the above handwriting electronic input system, in case handwriting input is performed electrically when the handwriting input is performed by the operator through the handwriting input section 120 in respect to the handwriting input detection section 130, the handwriting feeling producing section 140 generates vibration representing handwriting feeling in accordance with operation of the handwriting input section 120 to perform handwriting input. Whereby the handwriting electronic input system is realized where the same feeling as that of handwriting actual performed using the writing instrument can be obtained when handwriting input is electrically performed.

Also, the vibration wave generated by performing handwriting using the writing instrument on the writing object is stored in the memory section 103, and the writing feeling producing section 140 reproduces the vibration having been generated between the writing instrument and writing object so as to generated vibration. Whereby, the handwriting electronic input system is realized wherein when the handwriting input is electrically performed, the same feeling as that of handwriting actual performed using the writing instrument can be obtained in a state of combination of various kinds of writing instruments and writing objects.

Also, information of the writing instrument i.e. the thickness, the hardness and the elasticity of the pen tip is stored in conjunction with the vibration wave in the memory section 103. Thereby, the handwriting electronic input system is realized wherein when the handwriting input is electrically performed, the same feeling as that of handwriting actual performed using the writing instrument can be obtained by generating vibration based on the corresponding vibration wave which is read out from the memory, in a state of combination of various kinds of writing instruments and writing objects.

Also, by storing information of a viscosity and characteristic (water base or oil base) of ink used in the writing instrument is further stored in the memory section 103 in conjunction with the vibration waves, the handwriting electronic input system is realized, wherein when handwriting input is electrically performed, the same feeling as that of handwriting actual performed using the writing instrument can be obtained by generating vibration based on the corresponding vibration wave, which is read out from the memory section, in a state of combination of various kinds of writing instruments and writing objects.

Also, by disposing the hand writing feeling producing section 140 at the grip opposition of the handwriting input section 120, the handwriting electronic input system is realized, wherein when handwriting input is electrically performed the same feeling as that of handwriting actual performed using the writing instrument can be efficiently obtained in a state of combination of various kinds of writing instruments and writing objects.

Also, the handwriting input section 120 is provided with the handwriting feeling producing section 140 at a position in contact with a handwriting input detection section for information section 130. Whereby the handwriting electronic input system is realized wherein when handwriting input is electrically performed, the same feeling as that of handwriting actual performed using the writing instrument can be truly obtained in a state of combination of various kinds of writing instruments and writing objects.

Meanwhile, a magnitude of the vibration generated by the handwriting feeling producing section 140 can be adjusted to a preferable magnitude of the vibration of the operator by adjusting an adjusting knob disposed at the operation section 105 or at the handwriting input section 120.

The above case is realized by adjusting the amplitude of the vibration in accordance with an adjusting value in the processing section 101 or the handwriting feeling producing section 140.

Also, it is possible to adjust propagation feeling to be a feeling that the vibration is propagated directly or a feeling that the vibration is propagated mildly, by adjusting an adjusting knob disposed at the control section 105 or the handwriting input section 120 so as to control propagation of vibration. The above case is realized by adjusting a frequency element of the vibration wave in accordance with an adjusting value. Namely, it can be adjusted so that a smooth feeling is realized by emphasizing a low frequency area, and a direct feeling is realized by emphasizing a high frequency area.

Also, the handwriting feeling producing section 140 can be used no only to generate vibration, a portion of the signal to generate the vibration can be used for sound signal output. In the above case, a speaker can be disposed separately or vibration and sound can be generated simultaneously by integrating a vibration generation section and a sound generation section such as piezoelectric element and a piezoelectric speaker, or a voice coil motor and a dynamic speaker.

Whereby, when handwriting input is electronically performed, besides the vibration, the sound of hand writing in accordance with the vibration is generated, thus further preferable feeling representing that of handwriting performed actually using writing instrument can be obtained.

Figure 6:
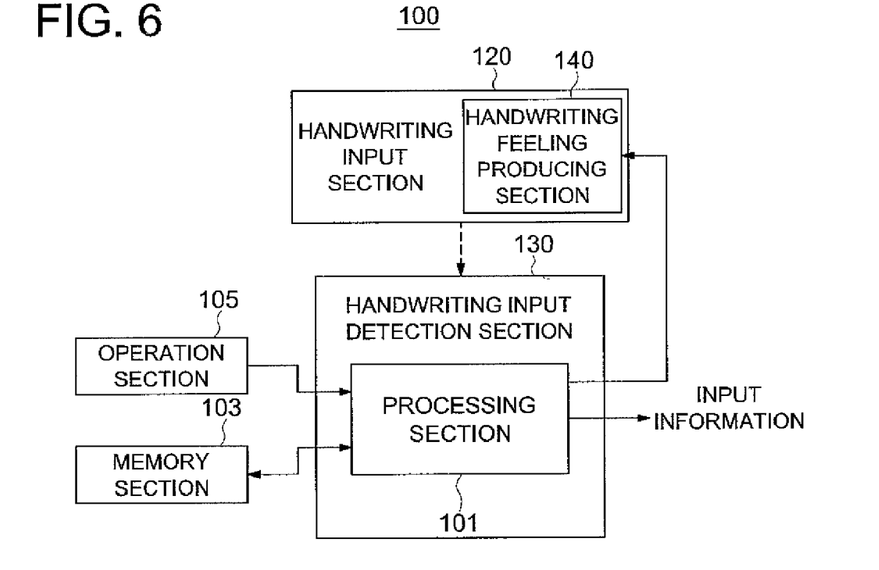
FIG. 6 is an explanatory diagram showing a structure of an embodiment of the present invention.

Also, as FIG. 6 shows, the processing section 101, the memory section 103, the operation section 105 in the above embodiment can be integrated into the handwriting input detection section 130 such as a tablet. Whereby connection of each section can be easy.

Figure 7:
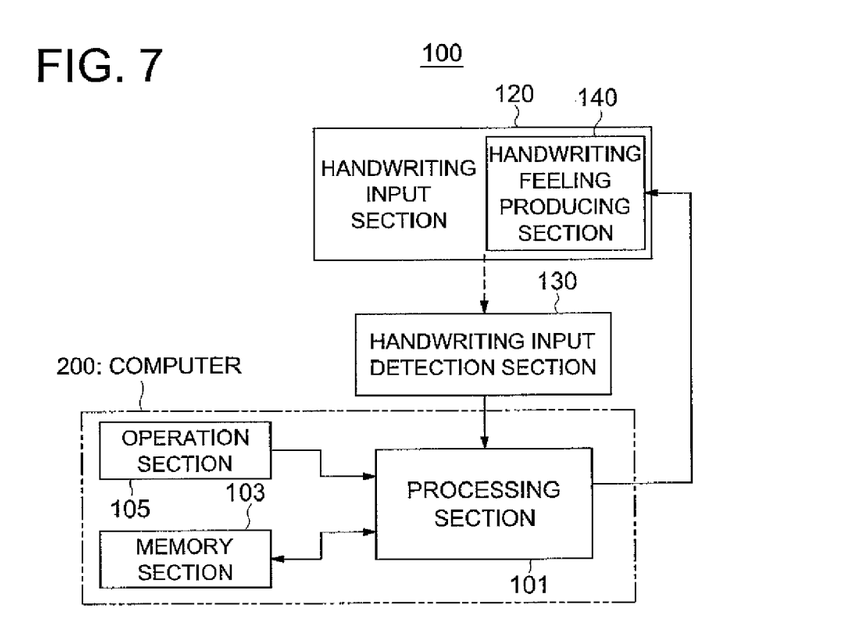
FIG. 7 is an explanatory diagram showing a structure of an embodiment of the present invention.

Also, as FIG. 7 shows the processing section 101, the memory section 103, the operation section 105 in the above embodiment can be integrated into a computer 200. Whereby owing to a capacity of a memory section and a processing ability of a CPU of the computer 200, various kinds of vibrations can be reproduced in a high accuracy.

Also, in the above case, the processing section 101 can be configured with hardware, software or a combination of the hardware and the software.

What is claimed is:

1. A handwriting electronic input system to electrically perform handwriting input, comprising:
   a handwriting input section used in handwriting input of information by an operator; and
   a handwriting input detection section to detect handwriting input of the information through the handwriting input section;
   wherein the handwriting input section is provided with a handwriting feeling producing section to generate vibration representing a handwriting feeling in accordance with operation of the handwriting input section at handwriting input of the information.

2. The handwriting electronic input system of claim 1 to electrically perform handwriting input, further comprising:
   a memory section to store a vibration wave generated by performing handwriting using a writing instrument on a writing object, wherein
   the handwriting feeling producing section generates the vibration which represents the vibration having been generated between the writing instrument and the writing object in accordance with operation of the handwriting input section when handwriting input is performed.

3. The handwriting electronic input system of claim 2, further comprising:
   an operation section to perform various entries,
   wherein the memory section stores information of the writing instrument which is a thickness, a hardness, a smoothness and an elasticity of a pen tip in conjunction with the vibration wave, and information of a surface condition of the writing object in conjunction with the vibration wave so that the vibration wave stored in the memory section can be read out based on the information of the writing instrument or the writing object entered through the operation section.

4. The handwriting electronic input system of claim 3, wherein information of ink viscosity used in the writing instrument is stored in the memory section in conjunction with the vibration wave.

5. The handwriting electronic input system of claim 1, wherein the handwriting feeling producing section is disposed at a grip position.

6. The handwriting electronic input system of claim 1, wherein the handwriting feeling producing section is disposed at a position in contact with the handwriting-input detection section.

* * * * *